(12) United States Patent
Kazuno

(10) Patent No.: US 11,565,606 B2
(45) Date of Patent: Jan. 31, 2023

(54) DIAGNOSTIC DEVICE, DIAGNOSTIC SYSTEM, DIAGNOSTIC METHOD, AND DIAGNOSTIC PROGRAM

(71) Applicant: HONDA MOTOR CO., LTD., Tokyo (JP)

(72) Inventor: Shuichi Kazuno, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 66 days.

(21) Appl. No.: 17/183,348

(22) Filed: Feb. 24, 2021

(65) Prior Publication Data

US 2021/0268933 A1 Sep. 2, 2021

(30) Foreign Application Priority Data

Feb. 28, 2020 (JP) .............................. JP2020-033465

(51) Int. Cl.
*B60L 58/16* (2019.01)
*B60L 58/18* (2019.01)

(52) U.S. Cl.
CPC ............... *B60L 58/16* (2019.02); *B60L 58/18* (2019.02); *B60L 2250/10* (2013.01)

(58) Field of Classification Search
None
See application file for complete search history.

(56) References Cited

U.S. PATENT DOCUMENTS

| 7,200,632 | B1* | 4/2007 | Greschler | H04L 67/34 709/227 |
| 2016/0046199 | A1* | 2/2016 | Butler | H02J 7/0048 320/106 |
| 2020/0160017 | A1* | 5/2020 | Kimura | B60L 58/16 |
| 2020/0247268 | A1* | 8/2020 | Aoyama | B60L 58/13 |
| 2021/0232862 | A1* | 7/2021 | Inoshita | G06N 20/00 |

FOREIGN PATENT DOCUMENTS

JP 2009208484 A 9/2009

* cited by examiner

*Primary Examiner* — Jared Fureman
*Assistant Examiner* — Joel Barnett
(74) *Attorney, Agent, or Firm* — CKC & Partners Co., LLC

(57) ABSTRACT

To prevent incorrect information from being given to a driver regarding the estimation of a degradation state of a secondary battery. A diagnostic device (100) for diagnosing a battery (40) provided in an electric vehicle (10), includes an estimation unit (301) that estimates a degradation state of the battery (40); a derivation unit (302) that derives an index value indicating validity of data used for the estimation of the degradation state; and a notification unit (303) that notifies, when accuracy of an estimated value is determined to be low based on the index value, a cause of a decrease in the accuracy of the estimated value.

4 Claims, 5 Drawing Sheets

FIG. 4

| NUMBER OF CAPACITY LEARNINGS (TIMES) | RELIABILITY (%) |
|---|---|
| ○○ | ○○ |
| ○○ | ○○ |
| ... | ... |

DIAGNOSTIC DEVICE, DIAGNOSTIC SYSTEM, DIAGNOSTIC METHOD, AND DIAGNOSTIC PROGRAM

This application is based on and claims the benefit of priority from Japanese Patent Application No. 2020-033465, filed on 28 Feb. 2020, the content of which is incorporated herein by reference.

BACKGROUND OF THE INVENTION

Field of the Invention

The present invention relates to a diagnostic device, a diagnostic system, a diagnostic method, and a diagnostic program.

Related Art

Conventionally, electric vehicles running by the driving force of a motor have been provided.
The electric vehicles include those that run only by the driving force of a motor, and those that run using the driving force or the like of an internal combustion engine in conjunction (hybrid electric vehicles).
Such an electric vehicle drives the motor by the electric power of a chargeable and dischargeable secondary battery, and it is known to display a value indicating the degradation state of the secondary battery (SOH: state of health) (e.g., Patent Document 1).
Patent Document 1: Japanese Unexamined Patent Application, Publication No. 2009-208484

SUMMARY OF THE INVENTION

However, in the conventional art, the estimation accuracy of the degradation state of the secondary battery may be low, and thus there is an issue of giving incorrect information to the driver.

The present invention has been made in consideration of such circumstances, and an object of the present invention is to prevent incorrect information from being given to a driver regarding the estimation of a degradation state of a secondary battery.

To achieve the above object, according to a first aspect of the present invention,
a diagnostic device for diagnosing a secondary battery provided in an electric vehicle, includes
an estimation unit that estimates a degradation state of the secondary battery;
a derivation unit that derives an index value indicating validity of data used for the estimation of the degradation state; and
a notification unit that notifies, when accuracy of an estimated value estimated by the estimation unit is determined to be low based on the index value, a cause of a decrease in the accuracy of the estimated value.

According to a second aspect of the present invention, in a diagnostic system for diagnosing a secondary battery provided in an electric vehicle by a server,
the server includes
an estimation unit that estimates a degradation state of the secondary battery by acquiring data through wireless data communication with the electric vehicle;
a derivation unit that derives an index value indicating validity of the data used for the estimation of the degradation state; and
a notification unit that notifies, when accuracy of an estimated value estimated by the estimation unit is determined to be low, the electric vehicle of a cause of a decrease in the accuracy of the estimated value.

In a third aspect of the present invention according to the second aspect,
when an abnormality occurs in the data communication with the server, the electric vehicle notifies a driver of the occurrence of the abnormality.

According to a fourth aspect of the present invention, a diagnostic method for diagnosing a secondary battery provided in an electric vehicle, includes
estimating a degradation state of the secondary battery;
deriving an index value indicating validity of data used for the estimation of the degradation state; and
notifying, when accuracy of the estimation of the degradation state is determined to be low based on the index value, a cause of a decrease in the accuracy of the estimation.

According to a fifth aspect of the present invention, in a diagnostic program for diagnosing a secondary battery provided in an electric vehicle by executing a predetermined processing procedure by execution of an arithmetic processing circuit,
the processing procedure includes
an estimation step of estimating a degradation state of the secondary battery;
a derivation step of deriving an index value indicating validity of data used for the estimation of the degradation state; and
a notification step of notifying, when accuracy of an estimated value estimated by the estimation step is determined to be low based on the index value, a cause of a decrease in the accuracy of the estimated value.

According to the present invention, it is possible to prevent incorrect information from being given to the driver regarding the estimation of the degradation state of the secondary battery.

BRIEF DESCRIPTION OF THE DRAWINGS

FIG. 4 is an explanatory diagram illustrating an example of a table for identifying the reliability from the total number of capacity learnings.

DETAILED DESCRIPTION OF THE INVENTION

First Embodiment

Figure 1:
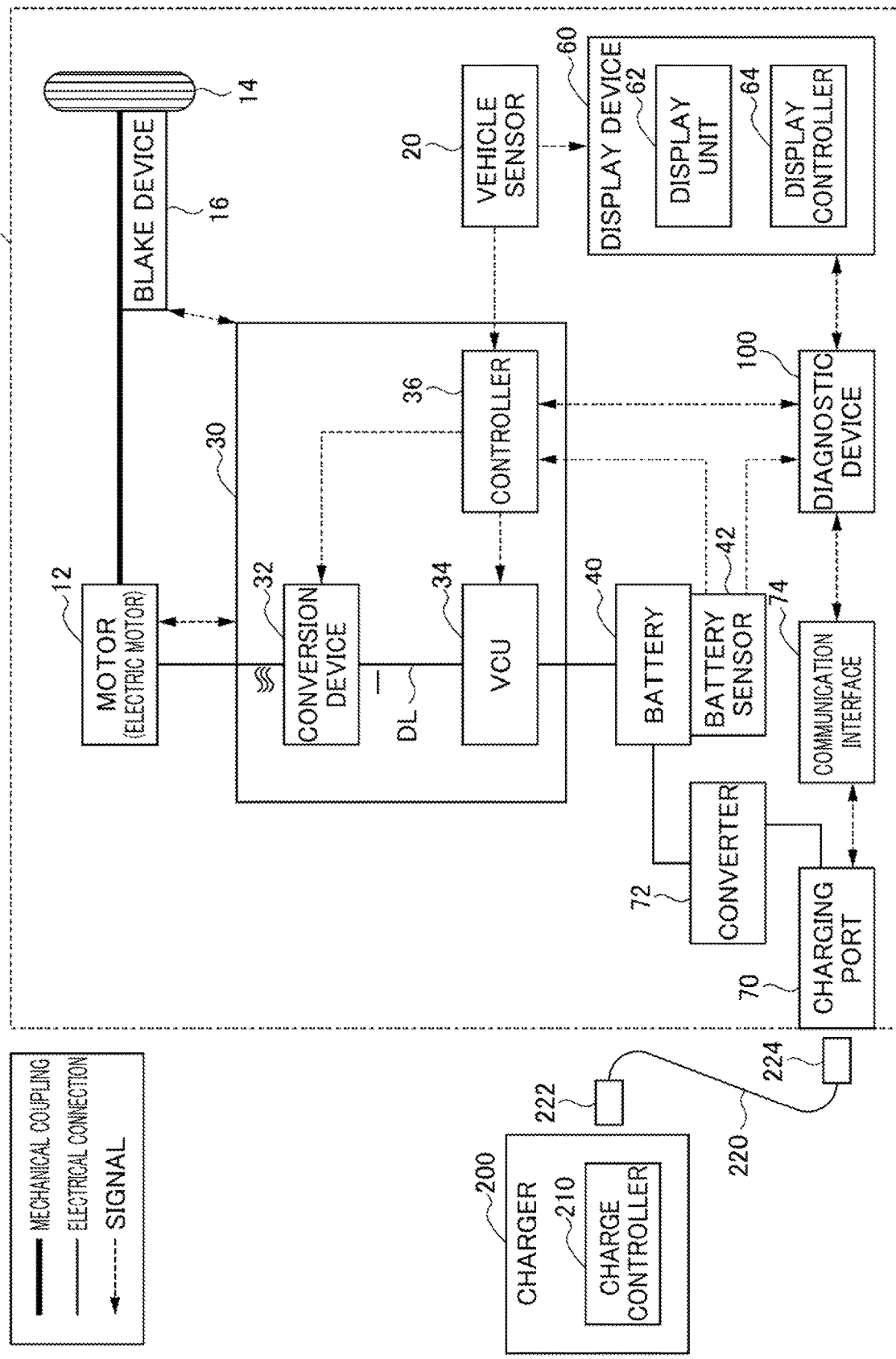
FIG. 1 is an explanatory diagram illustrating an example of the configuration of a diagnostic device.

FIG. 1 is a diagram illustrating an electric vehicle according to a first embodiment of the present invention.
An electric vehicle 10 is a vehicle equipped with a secondary battery (battery) 40 that supplies electric power for running, such as a hybrid vehicle or a fuel cell vehicle.
In the electric vehicle 10, while a plug 222 provided at one end of a charging cable 220 is connected to a charger 200, a plug 224 provided at the other end of the charging cable 220 is connected to a charging port 70 provided outside the vehicle body of the electric vehicle 10, and thereby the battery 40 is charged by the charge control of a charge controller 210 provided in the charger 200.

The invention according to the embodiment can be widely applied to non-contact charging instead of contact charging by a connection via the charging cable 220, charging with electric power of an internal combustion engine, a fuel cell, or the like provided in the electric vehicle 10, charging from a commercial power source using a built-in charging device, and other charging.

The electric vehicle 10 includes, for example, a motor 12, a drive wheel 14, a brake device 16, a vehicle sensor 20, a power control unit (PCU) 30, a battery (secondary battery) 40, a battery sensor 42, a display device 60, a charging port 70, a converter 72, a communication interface 75, and a diagnostic device 100.

The motor 12 is, for example, a three-phase AC motor. The motor 12 drives the drive wheel 14 by electric power supplied by connecting the rotor to the drive wheel 14, and during deceleration, generates electric power by the rotational energy of the drive wheel 14 and outputs the electric power.

The brake device 16 includes, for example, a brake caliper, a cylinder that transmits hydraulic pressure to the brake caliper, and an electric motor that generates hydraulic pressure in the cylinder. The brake device 16 may include, as a backup, a mechanism for transmitting the hydraulic pressure generated by the operation of the brake pedal to the cylinder through the master cylinder.

The brake device 16 is not limited to the configuration described above, and may be an electronically controlled hydraulic brake device that transmits the hydraulic pressure in the master cylinder to the cylinder.

The vehicle sensor 20 includes an accelerator opening sensor, a vehicle speed sensor, and a brake pedal depressing amount sensor.

The accelerator opening sensor is mounted to an accelerator pedal, which is an example of an operator that receives acceleration instructions by a driver, detects an operation amount of the accelerator pedal, and outputs it to a controller 36 as an accelerator opening.

The vehicle speed sensor includes, for example, wheel speed sensors mounted on respective wheels and a speed calculator, integrates the wheel speeds detected by the wheel speed sensors to derive the speed of the vehicle (vehicle speed), and outputs it to the controller 36 and the display device 60.

The brake pedal depressing amount sensor is mounted on the brake pedal, detects the operation amount of the brake pedal, and outputs it to the controller 36 as a brake pedal depressing amount.

A PCU 30 includes, for example, a conversion device 32, a voltage control unit (VCU) 34, and a controller 36.

These components may be arranged in a distributed manner without integrating these components as the PCU 30.

The conversion device 32 is, for example, an AC-DC conversion device.

The C side terminal of the conversion device 32 is connected to a CC link DL.

The battery 40 is connected to the DC link DL via the VCU 34.

The conversion device 32, during deceleration, converts the AC power generated by the motor 12 into DC power and outputs it to the DC link DL.

On the contrary, the conversion device 32, when the motor 12 is driven, converts the DC power output from the VCU 34 via the DC link DL into AC power and outputs it to the motor 12.

The VCU 34 is, for example, a DC-DC converter.

The VCU 34, when the motor 12 is driven, boosts the electric power supplied from the battery 40 and output it to the DC link DL, and conversely, during deceleration, outputs the electric power output from the DC link DL to the battery 40 by a predetermined voltage.

The controller 36 includes, for example, a motor controller, a brake controller, and a secondary battery and VCU controller.

The motor controller, the brake controller, and the secondary battery and VCU controller may be replaced with separate control devices, such as a motor electronic control unit (ECU), a brake ECU, and a secondary battery ECU.

The motor controller controls the motor 12 based on the output of the vehicle sensor 20.

The brake controller controls the brake device 16 based on the output of the vehicle sensor 20.

The secondary battery and VCU controller calculates the state of charge (SOC; secondary battery charging rate) of the battery 40 based on the output of the battery sensor 42 mounted on the battery 40, and outputs it to the VCU 34 and the diagnostic device 100.

The VCU 34 boosts the voltage of the DC link DL according to an instruction from the secondary battery and VCU controller.

The battery 40 is, for example, a secondary battery such as a lithium-ion battery.

The battery 40 stores electric power supplied from the charger 200 outside the electric vehicle 10, and outputs the stored electric power for the running of the electric vehicle 10.

In addition, during deceleration, the electric power output from the VCU 34 is stored.

The battery sensor 42 includes, for example, a current sensor, a voltage sensor, and a temperature sensor.

The battery sensor 42 detects, for example, a current value, a voltage value, and a temperature of the battery 40.

The battery sensor 42 outputs a detected current value, voltage value, temperature, etc. to the controller 36 and the diagnostic device 100.

The diagnostic device 100 estimates a degradation state (e.g., SOH: state of health) of the battery 40 based on the output of the battery sensor 42, and notifies the driver of the estimated result with the display device 60.

The diagnostic device 100 may be provided integrally with the controller 36.

Details of the diagnostic device 100 will be described later with reference to FIG. 3.

A communication interface 74 functions as an interface between the diagnostic device 100 and the charge controller 210, and transmits and receives various data via a signal line provided in the charging cable 220.

The display device 60 includes, for example, a display unit 62 and a display controller 64.

The display unit 62 displays information according to the control of the display controller 64.

The display controller 64 causes the display unit 62 to display information regarding the battery 40 in accordance with the information output from the vehicle sensor 20, the controller 36, and the diagnostic device 100.

The display controller 64 causes the display unit 62 to display the vehicle speed or the like output from the vehicle sensor 20.

The converter 72 is provided between the battery 40 and the charging port 70.

The converter 72 converts the AC power introduced from the charger 200 via the charging port 70 to DC power and outputs it to the battery 40.

Figure 2:
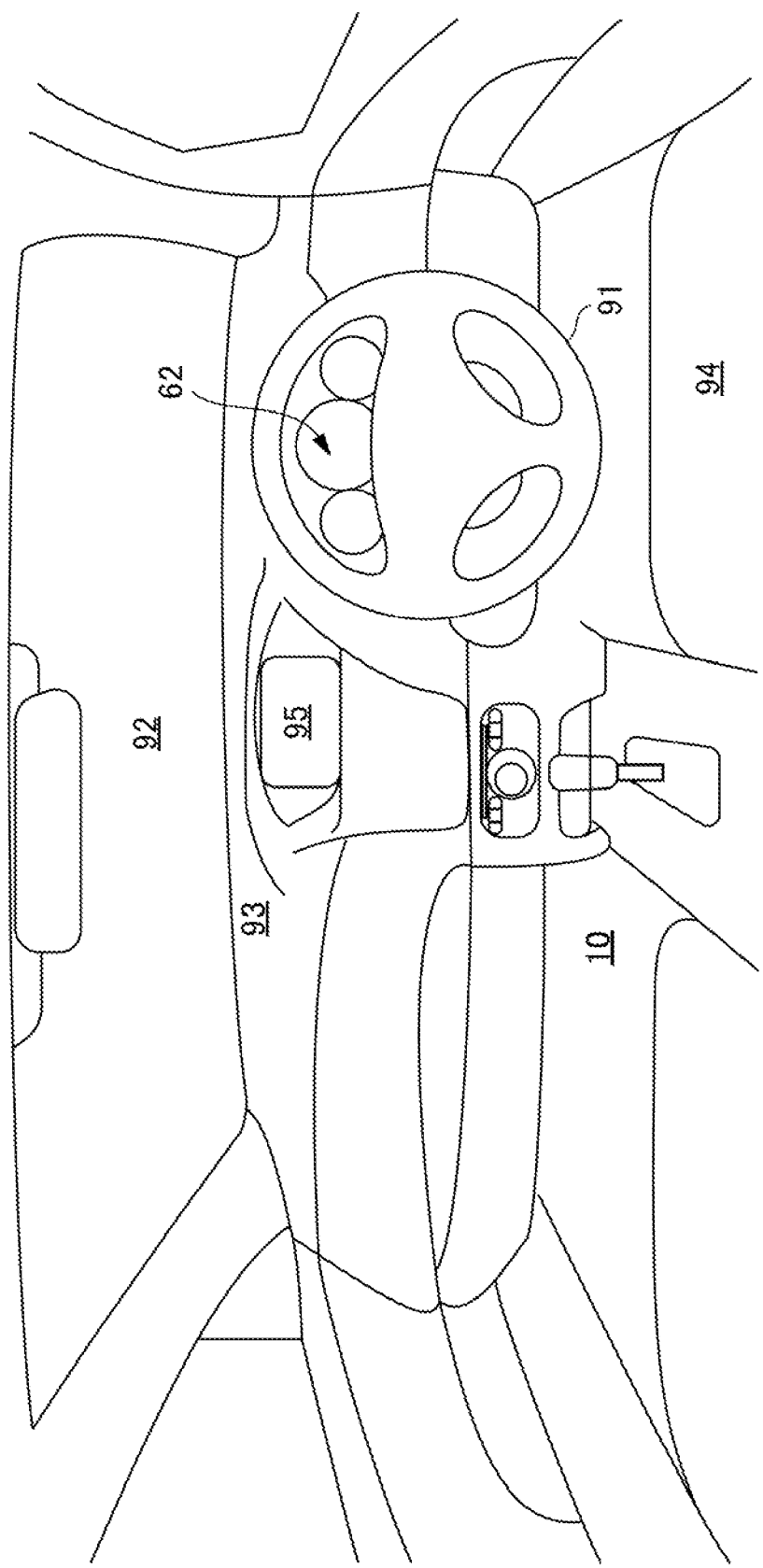
FIG. 2 is an explanatory view illustrating the configuration of a vehicle interior of an electric vehicle 10.

FIG. 2 is an explanatory view illustrating the configuration of a vehicle interior of the electric vehicle 10.

As shown in FIG. 2, for example, a steering wheel 91 that controls the steering of the electric vehicle 10, a front windshield 92 that separates the vehicle exterior and the vehicle interior, and an instrument panel 93 are provided in the electric vehicle 10.

The front windshield 92 is a member having optical transparency.

Further, near the front of a driver's seat 94 in the instrument panel 93 in the vehicle interior, the display unit 62 of the display device 60 is provided.

The display unit 62 is positioned so that it can be seen by the driver through a gap of the steering wheel 91 or over the steering wheel 91. Further, in the center of the instrument panel 93, a second display device 95 different from the display device 60 is provided.

The second display device 95 displays, for example, an image corresponding to a navigation process executed by a navigation device (not shown) installed in the electric vehicle 10, or displays an image of the other party in a video phone.

The second display device 95 may display a television program, reproduce a DVD, or may display the content of a downloaded movie or the like.

[Diagnostic Device 100]

Figure 3:
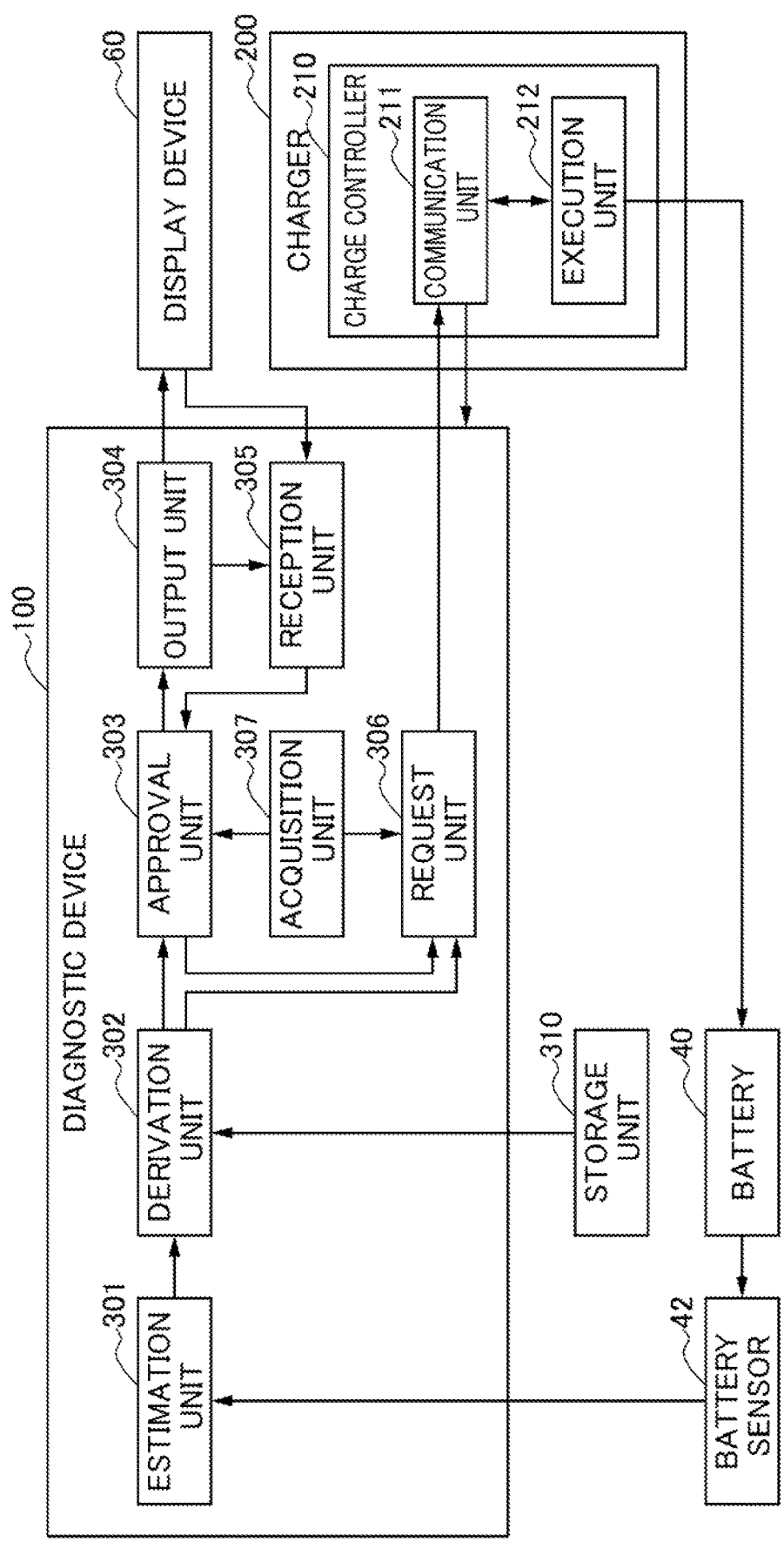
FIG. 3 is an explanatory diagram illustrating a diagnostic device 100 and peripheral components.

With reference to FIG. 3, the diagnostic device 100 and peripheral components of the diagnostic device 100 will be described. FIG. 3 is an explanatory diagram illustrating the diagnostic device 100 and peripheral components.

In FIG. 3, the diagnostic device 100 includes an estimation unit 301, a derivation unit 302, an approval unit 303, an output unit 304, a reception unit 305, a request unit 306, and an acquisition unit 307. The diagnostic device 100 executes a series of steps of a processing procedure by executing a program of the diagnostic device 100 with a built-in arithmetic processing circuit, and these functional blocks are configured.

Therefore, the processing procedure performed by the arithmetic processing circuit includes steps of executing the processes corresponding to the respective functional blocks.

Note that some or all of these components in the diagnostic device 100 may be realized by hardware (a circuit unit; including a circuitry) such as an LSI (Large Scale Integration), an ASIC (Application Specific Integrated Circuit), an FPGA (Field-Programmable Gate Array), or a GPU (Graphics Processing Unit), or may be realized by cooperation of software and hardware.

The estimation unit 301 estimates the degradation state of the battery 40 based on the output of the battery sensor 42 mounted on the battery 40.

Therefore, the battery sensor 42 is configured to detect at least the charge and discharge current (Ah) of the battery 40 and the terminal voltage of the battery 40, and further is configured to detect temperature or the like for use in charge and discharge control.

Here, the degradation state is, for example, a value estimated using the amount of change ($\Delta$Ah) of the charge and discharge amount ampere-hour (Ah) and the amount of change (SOC) of the proportion of the remaining capacity to the full charge capacity (charge amount: state-of-charge (SOC)).

Specifically, the amount of change ($\Delta$Ah) of the charge and discharge amount is, for example, a value calculated using the amount of current flowing through the battery 40 detected by the battery sensor 42 at certain different times.

The amount of change ($\Delta$SOC) of the SOC is a value calculated using the SOC at certain different times calculated using the output voltage of the battery 40 detected by the battery sensor 42 at the different times.

The estimation unit 301 estimates the degradation state of the battery 40 by calculating the full charge capacity ($=\Delta$Ah/$\Delta$SOC), which is obtained by dividing the amount of change ($\Delta$Ah) of the charge and discharge amount by the amount of change ($\Delta$SOC) of the state of charge. The estimation of battery degradation may be performed by another calculation method, and may be performed, for example, with an internal resistance value.

The degradation state of the battery 40 is a value that is more accurately calculated in the case of charge and discharge with a large $\Delta$SOC than in the case of charge and discharge with a small $\Delta$SOC.

The estimation unit 301 estimates the degradation state of the battery 40 at certain time intervals.

$\Delta$Ah and $\Delta$SOC may be calculated by, for example, the diagnostic device 100, or may be calculated by the controller 36.

The method of estimating the degradation state is not limited to the above-described method, and various methods can be applied.

The derivation unit 302 derives an index value indicating the validity of the data used for estimating the degradation state.

The data used for estimating the degradation state includes, for example, data indicating the amount of change ($\Delta$SOC) in which the charging rate of the battery 40 has changed.

The validity of the data is, for example, the reliability of the data. Thus, the index value corresponds to, for example, a value indicating the reliability for the degradation state of the battery 40.

The index value is a value corresponding to the amount of change ($\Delta$SOC) in which the charging rate (SOC) of the battery 40 is changed by charging and discharging during the running of the electric vehicle 10.

The derivation unit 302 derives the index value based on the amount of change ($\Delta$SOC) in which the charging rate of the battery 40 is changed by charging and discharging of the battery 40.

Further, the derivation unit 302 derives the index value based on the number of times (number of capacity learnings) the output of the battery sensor 42 is obtained as the data used for estimation by the estimation unit 301.

The output of the battery sensor 42 referred to here is, for example, an output of data indicating that charge and discharge with a certain amount or more of the amount of change in SOC ($\Delta$SOC) has been performed during the running of the electric vehicle 10.

Hereinafter, the matter that charge and discharge with a certain amount or more of the amount of change in SOC ($\Delta$SOC) (charge and discharge with a large $\Delta$SOC) are performed is referred to as "capacity learning", and the number of times capacity learning is performed is referred to as "number of capacity learnings".

Although the derivation unit 302 derives the index value every time the degradation state is estimated by the estimation unit 301, it may derive the index value every time the degradation state is estimated a certain plurality of times, or may derive the index value by dynamically changing the predetermined number of times. Alternatively, the index value may be calculated when the electric vehicle 10 stops and the approval unit 303 determines that capacity learning operation can be executed, to be described later.

The derivation unit 302 derives the index value based on the number of capacity learnings during the running of the electric vehicle 10.

The index value is, for example, a value corresponding to the number of capacity learnings within a certain period of time. Specifically, the index value corresponds to, for example, a low value for a small number of capacity learnings, and corresponds to a high value for a large number of capacity learnings.

A storage unit 310 stores, for example, a history of capacity learning data including information indicating that capacity learning has been performed, and information indicating the date and time and location when each capacity learning has been performed.

The storage unit 310 updates the stored content estimated by the estimation unit 301.

In addition, the storage unit 310 stores a table (see FIG. 4) in which the number of capacity learnings and the index value (value indicating reliability) are associated with each other.

For example, the derivation unit 302 refers to the storage unit 310 to calculate the number of capacity learnings within a certain period of time, refers to the table, and derives an index value corresponding to the calculated number of capacity learnings.

The storage unit 310 is realized by a storage device such as a flash memory, for example.

Further, the index value is not limited to a value corresponding to the number of capacity learnings, and various methods can be widely applied.

Specifically, for example, the index value may be a value corresponding to the value obtained from the amount of change (ΔSOC) in which the charging rate of the battery 40 is changed by charging and discharging of the battery 40 (e.g., the sum of squares of ΔSOC). The index value may be, for example, a value corresponding to the value obtained from the latest capacity learning (the sum of squares of ΔSOC).

Since ΔSOC can be made remarkable even in this way, even if the sum of squares is used, the degradation state of the battery 40 can be estimated with high accuracy.

The index value may be a value corresponding to the number of capacity learning operations to be described later. The index value may be a value corresponding to the number of capacity learnings within a certain period of time.

Here, the capacity learning operation is a process of capacity learning performed by intentionally charging and discharging the electric power of the battery 40 in the electric vehicle 10 during parking.

FIG. 4 is a table showing an example of a table used for calculating the index value.

The reliability corresponding to the number of capacity learnings is recorded, and the derivation unit 302 calculates the reliability (index value) by referring to this table based on the number of capacity learnings since the start of running.

Various methods can be applied to calculate the index value.

For example, the longer the travel distance (the longer the travel distance of the period in which the discharge of the battery 40 is continued under a constant condition used for calculating the estimated value), the higher the accuracy of the estimated value of the degradation state. The index value may be determined by utilizing the travel distance. For example, it may be set to be proportional to the travel distance.

Since the estimated value of the degradation state is changed by the temperature of the battery 40, the index value may be determined by utilizing the temperature of the battery 40 detected by the battery sensor 42. For example, the index value may be set to be inversely proportional to the temperature difference of the battery 40 with respect to the reference temperature.

These various index value calculation methods may be combined to calculate the index value.

The storage unit 310 records and holds the information used to calculate the index value (e.g., the temperature of the battery 40, the travel distance, etc.) when the index value is calculated by these index value calculation methods.

The approval unit 303 determines whether the accuracy of the estimated value estimated by the estimation unit 301 is low by determining the index value acquired by the derivation unit 302 based on a determination reference value.

Further, if the accuracy of the estimated value is determined to be low, information regarding a predicted cause of the decrease in the accuracy is estimated.

Further, the information regarding the estimated cause is output to the output unit 304 together with information that requests approval for execution of the capacity learning operation.

The output unit 304 displays an image on the display device 60 based on the information output from the approval unit 303, and displays the predicted cause of the decrease in the accuracy and information that requests approval for execution of the capacity learning operation.

The approval unit 303 executes a process of requesting approval for the execution of the capacity learning operation when the electric vehicle 10 is parked and it is determined that the capacity learning operation can be executed.

More specifically, the approval unit 303 determines that the capacity learning operation can be executed, when the electric vehicle 10 is parked, based on the current position information, the parking position is a point where the vehicle can be parked for a long time based on the map information, and further, the charger 200 capable of executing the capacity learning operation is provided.

Instead of or in addition to these, the past parking history and the execution history of the capacity learning operation may be referred to.

The acquisition unit 307 acquires information for determining whether the capacity learning operation can be executed.

Here, in the case where the index value is determined based on the number of learnings, when a decrease in the accuracy is detected, the accuracy is low because the number of learnings used for calculation of the index value is small.

In this case, the accuracy is decreased in the following cases: when the vehicle is repeatedly driven over short distances, when the vehicle is frequently charged by the charger 200 without being fully discharged, when the vehicle is frequently charged by high-speed charging and there are few opportunities for learning, or when there are few opportunities for charging.

In addition, the following cases are predicted: when the index value is determined based on the battery temperature, when the temperature of the battery 40 is high, or conversely, when the temperature is low. It is predicted that the travel distance is shortened, when the index value is determined based on the travel distance.

Thus, the approval unit 303 determines the information used for the calculation of the index value which is recorded in the storage unit 310 according to the calculation method of the index value by the derivation unit 302, and estimates a predicted cause of a decrease in the accuracy.

The approval unit 303 displays, on the display device 60, a message prompting the driver to select whether to execute the capacity learning operation, and further displays a menu for selecting whether to execute the capacity learning operation.

In addition, the approval unit 303 displays a decrease in the reliability of the battery degradation state.

If the index value is determined based on the number of learnings, and the battery is charged frequently by the charger 200 without discharging sufficiently, a message of "accurate degradation diagnosis cannot be performed because of frequent high SOC" is displayed to notify the cause of the decrease in the accuracy.

If the index value is determined based on the number of learnings, and there are many opportunities for high-speed charging and few opportunities for learning, a message of "since high-speed charging is frequently performed, accurate degradation diagnosis cannot be performed" is displayed to notify the cause of the decrease in the accuracy.

If the index value is determined based on the number of learnings, and there are few opportunities for charging, a message of "since there are few opportunities for charging, accurate degradation diagnosis cannot be performed" is displayed to notify the cause of the decrease in the accuracy.

The approval unit 303 constitutes a notification unit that notifies the cause of the decrease in the accuracy of the estimated value. Such a message prompting the driver to select whether to execute the capacity learning operation and such a notification of a cause of a decrease in the accuracy may be executed by voice or may be executed by both voice and image display.

By notifying the cause of the decrease in the accuracy of the estimated value in this way, the diagnostic device 100 can notify the driver of the estimation of the degradation state of the secondary battery with sufficient caution, so as not to give incorrect information to the driver.

This prevents the driver from executing the capacity learning operation wastefully or enables the driver to actively execute the capacity learning operation, and thus it is possible to flexibly cope with the decrease in the accuracy of the estimated value.

The reception unit 305 receives whether to execute the capacity learning operation by detecting the operation of the touch panel provided in the display device 60.

When the reception unit 305 detects that the driver has selected a menu for not executing the capacity learning operation, the approval unit 303 ends a series of processes. In contrast, when a menu selection by the driver to execute the capacity learning operation is detected, the process of the capacity learning operation is started.

Note that the process may be started when a certain time elapses by accepting a reservation of the capacity learning operation.

At the start of this process, the approval unit 303 controls the operation of the charger 200 by data communication with the charger 210 via the request unit 306, charges and discharges the battery 40 according to a fixed sequence, detects an estimated value and an index value, and records the values in the storage unit 310.

Here, the request unit 306 is an interface related to data communication, and the charger 200 includes a communication unit 211, which is an interface related to data communication, corresponding to the request unit 306, and includes an execution unit 212 which executes charge and discharge control of the battery 40 through data communication by the communication unit 211.

According to the above-described configuration, when the accuracy of the estimated value is determined to be low, by notifying the cause of the decrease in the accuracy of the estimated value, it is possible to notify the driver of the estimation of the degradation state of the secondary battery with sufficient caution, so as not to give incorrect information to the driver.

Second Embodiment

Figure 5:
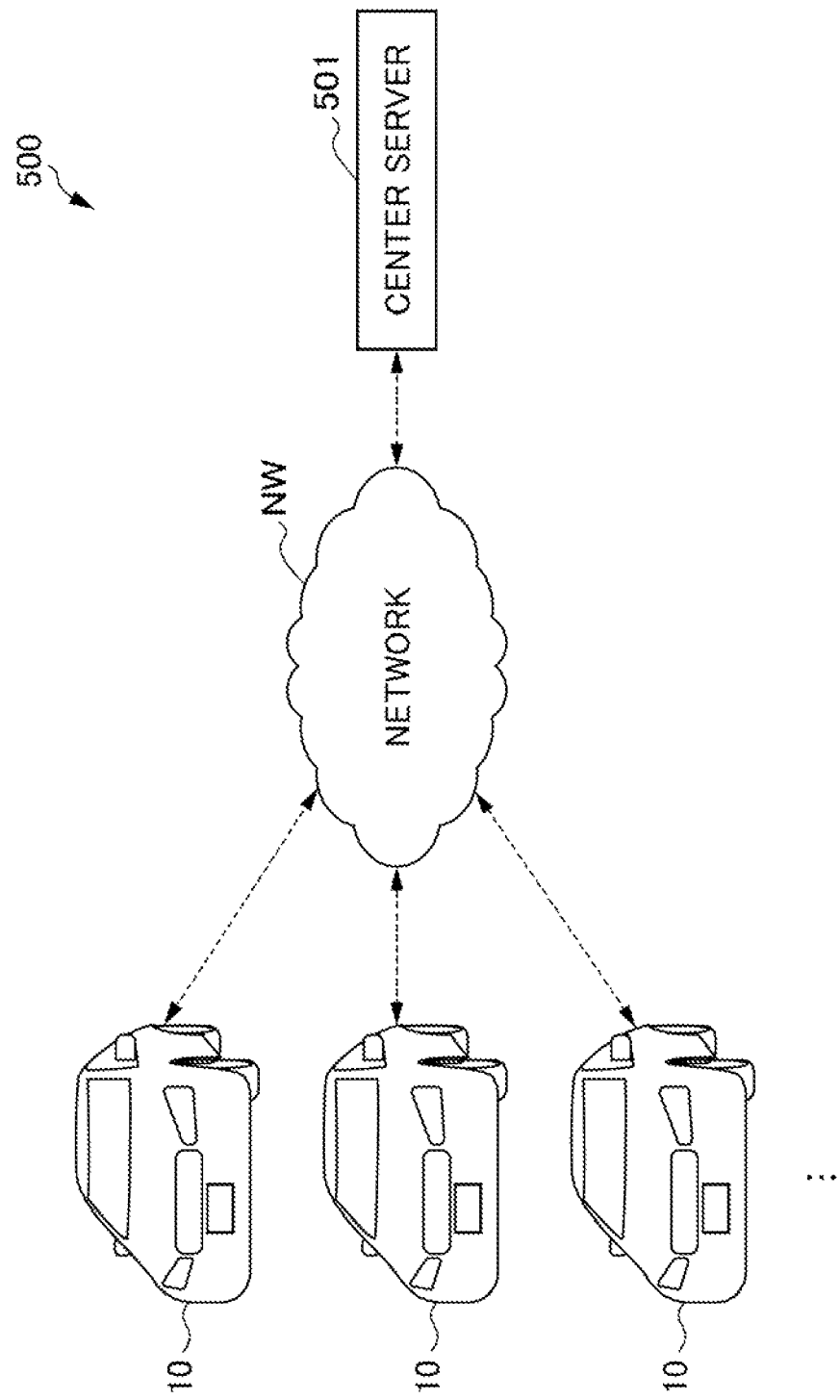
FIG. 5 is an explanatory diagram illustrating the configuration of a diagnostic system.

FIG. 5 is a diagram illustrating a diagnostic system according to a second embodiment of the present invention. A diagnostic system 500 is configured such that a plurality of electric vehicles 10 is connected to a center server 501 via a network NM and data communication is possible between the electric vehicles 10 and the center server 501 by wireless communication.

In the diagnosis system 500, a degradation diagnosis function is provided in the center server 501, and the center server 501 detects the degradation state of the secondary battery in each electric vehicle 10.

Therefore, the center server 501 obtains the data necessary for calculating the estimated value and the index value of the secondary battery from the electric vehicle 10 by data communication with the electric vehicle 10, and calculates the estimated value and the index value of the degradation state.

The center server 501 notifies the electric vehicle 10 of information regarding the capacity learning operation.

The center server 501, in this notification, similarly to the diagnostic device 100 according to the first embodiment, notifies the cause of the decrease in the accuracy of the estimated value.

In response to this configuration of the center server 501, the electric vehicle 10 provides the data necessary for the process of the center server 501 to the center server 501, and executes the capacity learning operation based on the information regarding the capacity learning operation obtained from the center server 501.

At this time, similarly to the first embodiment, the center server 501 notifies the driver of the cause of the decrease in the accuracy to prompt the driver to select whether to execute the capacity learning operation.

The second embodiment is configured similarly to the first embodiment except that the feature relating to the degradation diagnosis is different.

As in this embodiment, even in the case of the degradation diagnosis by the server, it is possible to prevent incorrect information from being given to the driver regarding the estimation of the degradation state of the secondary battery.

When an abnormality occurs in data communication with the center server 201, the electric vehicle 10 notifies the driver of the abnormality.

When it is determined that the occurrence of the abnormality decreases the accuracy of the estimated value, this notification is notified as the cause of the decrease in the accuracy. However, there are cases where the occurrence of an abnormality is not to the extent that it decreases the accuracy of the estimated value, and in this case, the occurrence of the abnormality may be notified together with the cause of a decrease in the accuracy.

Further, the occurrence of an abnormality may be notified in real time.

As a result, when a communication error occurs at the time of degradation diagnosis, the diagnosis system 500 notifies the driver that the communication error has occurred, and gives the driver a sense of security.

Here, examples of the communication abnormality include a decrease in electric field strength and a decrease in transmission speed due to an increase in the error rate. For example, there may be a cause on the electric vehicle 10 side, such as when the electric vehicle 10 enters the shadow of a mountain, or there may be a cause on the server 501 side, such as when access is concentrated.

Thus, the notification of the communication abnormality may be made not only by simply notifying the occurrence of the abnormality but also by notifying the content of the error in detail.

Specifically, for example, when a response is not obtained from the server, a message indicating "server communication error" may be displayed, or when the server repeatedly requests retransmission, a message indicating "vehicle side transmission error" may be displayed, or when the cause cannot be immediately identified, a message indicating "error cause analysis in progress" may be displayed.

According to this embodiment, even in the case of the degradation diagnosis by the server, it is possible to prevent incorrect information from being given to the driver regarding the estimation of the degradation state of the secondary battery.

In addition, notifying the driver of abnormalities in data communication can give the driver a sense of security.

Third Embodiment

In this embodiment, in the configuration of the first or second embodiment, the amount of charge of a battery 40 is displayed together with the degradation state and reliability by the operation of the driver.

In this display, when it is determined that the accuracy of the estimated value (reliability) of the degradation state is low, an electric vehicle 10 notifies the cause of the decrease in the accuracy of the estimated value as well.

It should be noted that various configurations can be widely applied to this display, for example, on-screen display on a display screen of a navigation device, and display on a front window by a head-up display.

In this way, the driver can be notified of the reliability and the cause of a decrease in the accuracy by the operation of the driver, so that the driver is not given incorrect information regarding the estimation of the degradation state of the secondary battery.

Other Embodiments

Although the modes for carrying out the present invention have been described above using embodiments, the present invention is not limited to these embodiments in any way, and various modifications and substitutions can be made within a scope that does not depart from the gist of the present invention.

EXPLANATION OF REFERENCE NUMERALS 10 vehicle
12 motor
36 controller
40 battery
42 battery sensor
60 display device
62 display unit
64 display controller
70 charging port
100 diagnostic device
200 charger
210 charge controller
301 estimation unit
302 derivation unit
303 approval unit
304 output unit
305 reception unit
306 request unit
307 acquisition unit
310 storage unit
500 diagnostic system
501 center server

What is claimed is:

1. A diagnostic device for diagnosing a secondary battery provided in an electric vehicle, the diagnostic device comprising:
    an estimation unit configured to estimate a degradation state of the secondary battery;
    a derivation unit configured to derive an index value indicating validity of data used for the estimation of the degradation state; and
    a notification unit configured to notify, when accuracy of an estimated value estimated by the estimation unit is determined to be low by determining the index value based on a determination reference value, a cause of a decrease in the accuracy of the estimated value.

2. A diagnostic system for diagnosing a secondary battery provided in an electric vehicle by a server, the server comprising:
    an estimation unit configured to estimate a degradation state of the secondary battery by acquiring data through wireless data communication with the electric vehicle;
    a derivation unit configured to derive an index value indicating validity of the data used for the estimation of the degradation state; and
    a notification unit configured to notify, when accuracy of an estimated value estimated by the estimation unit is determined to be low by determining the index value based on a determination reference value, the electric vehicle of a cause of a decrease in the accuracy of the estimated value.

3. The diagnostic system according to claim 2, wherein, when an abnormality occurs in the data communication with the server, the electric vehicle notifies a driver of the occurrence of the abnormality.

4. A diagnostic method for diagnosing a secondary battery provided in an electric vehicle, the diagnostic method comprising:
    estimating a degradation state of the secondary battery;
    deriving an index value indicating validity of data used for the estimation of the degradation state; and
    notifying; when accuracy of the estimation of the degradation state is determined to be low by determining the index value based on a determination reference value, a cause of a decrease in the accuracy of the estimation.

* * * * *